Dec. 5, 1944.   L. D. MANNES ET AL   2,364,379
COLOR CORRECTION IN DUPLICATING COLOR PHOTOGRAPHS
Filed Nov. 23, 1940
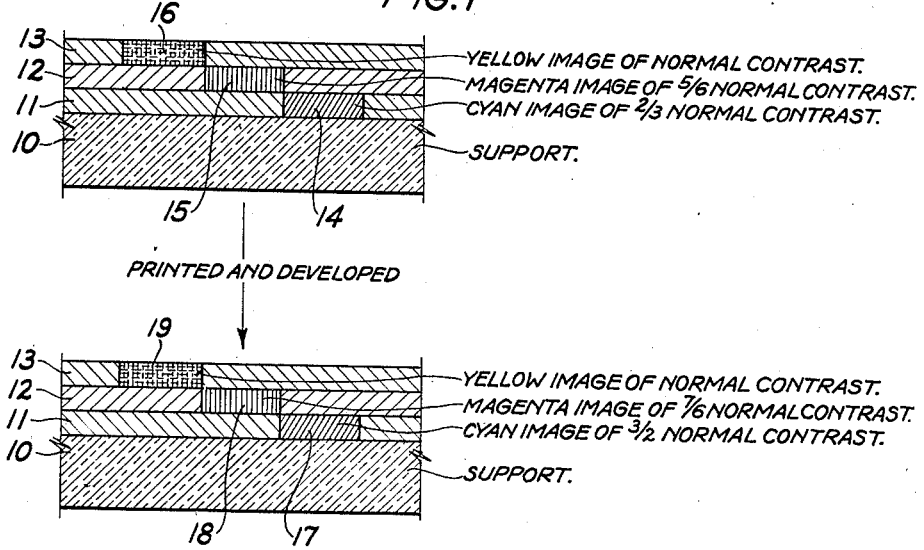
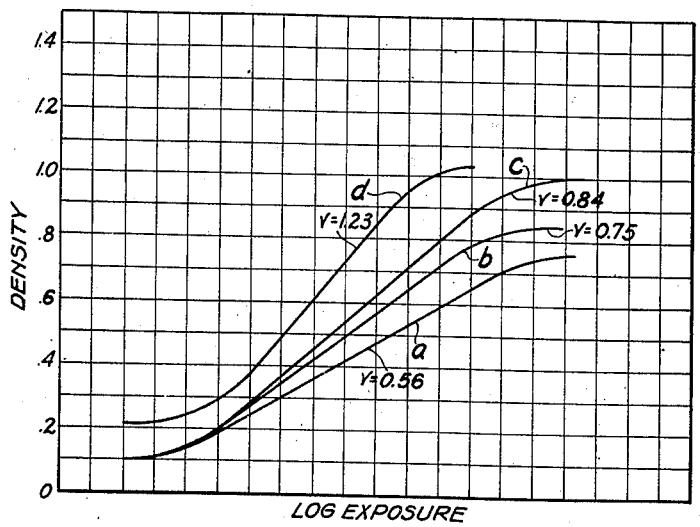
LEOPOLD D. MANNES
LEOPOLD GODOWSKY JR.
INVENTORS
BY Newton M. Perrine
R. Frank Smith
ATTORNEYS Patented Dec. 5, 1944

2,364,379

UNITED STATES PATENT OFFICE 2,364,379

COLOR CORRECTION IN DUPLICATING COLOR PHOTOGRAPHS

Leopold D. Mannes, New York, N. Y., and Leopold Godowsky, Jr., Westport, Conn., assignors to Eastman Kodak Company, Rochester, N. Y., a corporation of New Jersey Application November 23, 1940, Serial No. 366,854
In Great Britain January 11, 1940

1 Claim. (Cl. 95—2)

This invention relates to color photography and particularly to a method for obtaining color corrected duplicate color photographs.

In the direct duplication of color photographs by contact or projection printing at a single step it is not possible in practice to reproduce the color saturation of the original without increasing the contrast. A fundamental reason for this is the impurity of available coloring materials used in the process. It is well known that no available dyes have absorption characteristics which coincide with the ideal curves for the complementary subtractive colors to be used in the usual three-color process. In certain color processes the chemical limitations of the process frequently restrict the choice of dyes to such an extent that certain coloring materials must be used whose absorption characteristics are known to be greatly inferior to those ideally desirable. The cyan or blue-green dye required for the component image corresponding to the red record is often the least satisfactory of the three subtractive colors inasmuch as it absorbs a very appreciable amount of blue and green light which theoretically should transmit completely. In duplicating a color photograph made with such inferior cyan dye, the result of the impurity upon the printing material is that the cyan image of the original produces an appreciable record in the green-sensitive and blue-sensitive emulsions of the duplicate. This appreciable record consists of a decrease in exposure proportional to the density of the original cyan image whereas, if the original cyan dye were completely transmissive to blue and green, the exposure of the blue and green emulsion components of the duplicate would be complete. As a result, the cyan color reproduced in the duplicate becomes contaminated by a certain amount of the other two color components and the final color appears desaturated.

It is, therefore, an object of the present invention to provide a means of duplicating a color photograph which will diminish the undesirable effect described above. A further object is to provide a colored original in which the characteristics of the colors are so altered that a correct colored print can be produced. Other objects will appear from the following description of our invention.

These objects are accomplished by making a multi-color original in which the contrast of the cyan image is described with respect to the contrast of the yellow image and printing said images onto a second multi-layer material in which the contrast of the cyan image is increased with respect to the contrast of the yellow image. The preferred method consists in lowering the contrast of the cyan image in the original and accordingly increasing the contrast of the cyan image in the duplicate leaving the other two image contrast relationships in both original and duplicate at their normal level.

In the accompanying drawing, Fig. 1 is a flow diagram showing in sectional view a colored original and a colored print made according to our invention and Fig. 2 is a chart illustrating the method in which the contrast of the images may be changed.

Any suitable three-color film and process, either negative or reversal, may be used in our invention but we prefer to use a multi-color process such as that described in our prior Patent 2,113,329, granted April 5, 1938, or in Mannes, Godowsky and Wilder U. S. Patent 2,252,718, granted August 19, 1941. In these processes colored images are formed by development in which the development product of a primary aromatic amino developing agent couples with a color-forming or coupling compound to form a dye image. In these processes a cyan dye coupler may be used which produces a cyan dye having the undesirable absorption characteristic described above. In a process of this character, if the contrast of the original cyan record is reduced, for example, to $\frac{2}{3}$ or $\frac{1}{2}$ the normal contrast, it will produce only $\frac{2}{3}$ or $\frac{1}{2}$ of its normal adverse effect on printing because its undesirable absorption of blue and green light will have been reduced by that amount. Naturally its desired absorption of red light will also be reduced by that amount but by correspondingly increasing the contrast of the cyan image of the duplicate, this latter reduction in absorption may be effectively compensated. Similarly, the contrast of the magenta dye, which absorbs some blue light, which it should transmit, may be reduced in the original and its contrast correspondingly increased in the duplicate.

It is not necessary, in our method, that the contrast of the cyan image in the original be reduced. Any method may be used by which the contrast of the cyan image is decreased with respect to the contrast of the yellow image in the original and the contrast of the cyan image correspondingly increased with respect to the contrast of the yellow image in the print may be used. It often happens that the yellow component image which is visually satisfactory for a balanced result is insufficiently high in contrast to produce a satisfactory record on the blue-sensitive component of the printing material. This discrepancy is due to differences between photographic and visual characteristics. It has, therefore, been found expedient in certain cases to increase the contrast of the yellow image in the original beyond visual requirements in order to produce a more nearly satisfactory result. It is understood that the contrast of the yellow image in the duplicate may be varied at will to produce visually satisfactory balance. Inasmuch as most yellow coloring materials transmit very efficiently at the peak of the green-sensitive and red-sensitive regions of the usual three-color emulsion components, there is little danger of contamination in printing which might result from an increase in the contrast of the original yellow image. If the contrast of the yellow image in the original is increased, the contrast of the cyan image may be left at its normal level or may be decreased slightly and compensation made in the print by slightly increasing the contrast of the cyan image and slightly decreasing the contrast of the yellow image. If the contrast of the yellow and magenta images in the original is increased, the contrast of the cyan image may be left at its normal level, and the usual compensation made in the print by decreasing the contrast of the yellow and magenta images.

The following chart in which + indicates an increase in contrast, − indicates a decrease in contrast and 0 indicates no change, that is normal procedure, illustrates possible variations in processing procedure, or in emulsion characteristics, in order to effect color correction, although it is by no means exhaustive of the possibilities:

|         | Original | Duplicate | Original | Duplicate |
|---------|----------|-----------|----------|-----------|
| Cyan    |          | ++        | −        | +         |
| Magenta | −        | +         | 0        | 0         |
| Yellow  | 0        | 0         | +        | −         |

The alteration of contrast in the original and printing material may be accomplished either by emulsion changes or by processing changes. The following processing changes are possible:
1. Changing the concentration of the coupler.
2. Changing the sulfite concentration.
3. Use of couplers which produce a soluble dye image.
4. Use of auxiliary or competing developers.

Processing changes may be illustrated by referring to the following standard cyan developer formula changes described in Mannes, Godowsky and Wilder U. S. Patent 2,252,718.

Solution A p-Aminodiethylaniline hydrochloride
grams__ 2
Sodium sulfite_____do____ 6
Sodium carbonate_____do____ 50
Potassium bromide_____do____ 5
Potassium thiocyanate_____do____ 1
Water to_____cc__ 950

Solution B o-Hydroxy diphenyl_____grams__ 3
Sodium hydroxide_____do____ 5
Water to_____cc__ 50

(Solution B is added to Solution A. Develop for 12 minutes.)

Using this developer, cyan reversal images were obtained on a multi-layer reversal film by exposure, development in an ordinary MQ developer such as that described in Patent 2,252,718, printing with red light and color development.

To determine the effect of change in coupler concentration on the contrast, the following amounts of o-hydroxy diphenyl were substituted for that in the standard formula, with the resulting gammas as indicated.

|                                   | Gamma | $D_{max}$ |
|-----------------------------------|-------|-----------|
| 0.5 g. o-hydroxy diphenyl         | 0.56  | .76       |
| 1.5 g. o-hydroxy diphenyl         | 0.75  | .84       |
| 3.0 g. o-hydroxy diphenyl (standard) | 0.84 | 1.0     |
| 6.0 g. o-hydroxy diphenyl         | 1.23  | 1.02      |

A series of different sulfite concentrations were substituted for that in the standard formula, as follows:

|                               | Gamma | $D_{max}$ |
|-------------------------------|-------|-----------|
| 0.5 g. Sodium sulfite         | 1.12  | 1.55      |
| 2.0 g. Sodium sulfite         | 1.03  | 1.30      |
| 6.0 g. Sodium sulfite (standard) | 0.84 | 1.0    |
| 20.0 g. Sodium sulfite        | 0.43  | .75       |

As an example of a coupler giving a soluble dye image, 1-amino-8-naphthol-3,6-disulfonic acid (H acid) was tested, the following amounts being added to the standard formula:

|             | Gamma | $D_{max}$ |
|-------------|-------|-----------|
| 0.0 g. H acid | 0.84 | 1.0      |
| 0.1 g. H acid | 0.76 | .90      |
| 0.3 g. H acid | 0.57 | .70      |
| 1.0 g. H acid | 0.43 | .60      |

Elon (monomethyl-p-amino phenol sulfate) was added to the standard formula to determine the influence of auxiliary or competing developers as follows:

|              | Gamma | $D_{max}$ |
|--------------|-------|-----------|
| 0.0 g. Elon  | 0.84  | 1.0       |
| 0.03 g. Elon | 0.78  | .84       |
| 0.10 g. Elon | 0.55  | .76       |
| 0.30 g. Elon | 0.54  | .58       |

In the preceding tables the contrast or "gamma" of the dye images was measured by removal of the metallic silver formed on development and was read on a densitometer through a complementary filter. H and D curves were plotted and the approximate maximum density was noted from them and recorded in the tables as $D_{max}$. Typical curves for the change produced by varying amounts of coupler are contained in Fig. 2 of the accompanying drawing.

With this particular emulsion and processing conditions it will be seen that the standard or normal gamma of the cyan dye image is 0.84. A correction can be produced by lowering the gamma of the cyan dye in the original to ⅔ that obtained with the standard formula. This can be done in one of four ways: (1) by lowering the coupler concentration to 0.5 gram per liter, (2) by increasing the sulfite concentration to something between 6 and 20 grams per liter, (3) by adding 0.3 gram per liter of H acid to the developer and (4) by adding 0.1 gram of Elon to the developer. If the gamma of the cyan dye in the original is thus reduced to approximately 0.56, that is ⅔ of that produced by the standard formula, it will be necessary to compensate for this by raising the gamma of the cyan dye in the duplicating material to 1½ that of the gamma produced by the standard formula or gamma of approximately 1.2. This increase can be accomplished by the use of 6 grams per liter of coupler or 0.5 gram per liter of sulfite instead of the amount used in the standard formula.

It will be apparent that similar changes can be made in the formula for the magenta developer, for example, that described in Patent No. 2,252,718. For example, where the contrast of the cyan image in the original is ⅔ normal, the contrast of the magenta image might be made ⅚ normal and in the print the contrast of the cyan image made 3/2 normal and the contrast of the magenta image made 6/5 normal. In both cases the contrast of the yellow image would be maintained at its normal level.

In case it is desired to increase the contrast of the yellow image in the original, it is necessary to make only a slight decrease in the contrast of the cyan image. For example, the contrast of the yellow image in the original might be made 1⅙ normal and the contrast of the cyan image ⅚ normal. In the duplicate the contrast of the yellow image would be 6/7 normal and the contrast of the cyan image 1⅕ normal. In both cases the magenta image might be left at its normal contrast.

Our process may also be applied to bleach-out methods of color photography, in which a dye is bleached in the region of the silver or silver halide image to form the colored image. The contrast of the emulsions used in such processes may be altered with appropriate adjustments in the amount of dye used, in order to secure the desired image contrast change.

Our invention will now be described by reference to the accompanying drawing. As shown in Fig. 1, a film having a support 10 of any suitable material such as cellulose ester or synthetic resin is coated with emulsion layers 11, 12 and 13 originally sensitive to the red, green and blue regions of the spectrum, respectively. In these layers there are formed cyan, magenta and yellow dye images by coupling development. In emulsion layer 11 there is formed cyan image 14 in which the contrast is ⅔ normal; in layer 12 there is formed magenta image 15 in which the contrast is ⅚ normal; and in layer 13 there is formed the yellow image 16 of normal contrast. This film is printed in the usual way onto a similar multi-layer material and the print developed so that images of correspondingly altered contrast are produced. The cyan image 17 produced in layer 11 as 3/2 normal contrast, the magenta image 18 produced in layer 12 as 6/5 normal contrast and the yellow image 19 produced in layer 13 has normal contrast.

Fig. 2 illustrates a set of characteristic curves illustrating the dye gammas obtained with change in the amount of coupler in the standard developer formula. In this chart, density of the dye images as obtained by reading the density through a complementary filter is plotted against the logarithm of the exposures producing them. Curve $c$ indicates the gamma of the standard developer formula while curves $a$ and $b$ indicate the gamma obtained with lower amounts of coupler in the developer and curve $d$ indicates the gamma obtained with a greater amount of coupler in the developer.

It is to be understood that the methods disclosed in this application may be used in conjunction with special printing filters or printing light of restricted wave length and that modifications may be made in the invention within the scope of the appended claim.

We claim:

The method of producing a natural-color photographic print of normal contrast and satisfactory color rendition, which comprises forming cyan, magenta, and yellow images in a multi-layer material by color-forming development steps, the cyan developer containing approximately one-sixth the amount of coupler necessary to form a dye image of normal contrast, and the yellow developer containing the amount of coupler necessary to form an image of normal contrast, printing said images onto a second multi-layer material, and developing images therein by color-forming development steps in which the cyan developer contains approximately twice the amount of coupler necessary to form a dye image of normal contrast, and the yellow developer contains the amount of coupler necessary to form an image of normal contrast.

LEOPOLD D. MANNES.
LEOPOLD GODOWSKY, Jr.